United States Patent [19]
Bryant et al.

[11] Patent Number: 5,889,343

[45] Date of Patent: Mar. 30, 1999

[54] ELECTROMECHANICAL MACHINE HAVING IMPROVED LEAD WIRE SEALING ARRANGEMENT

[75] Inventors: Roger A. Bryant, Commerce; Gary A. Arthur, Athens, both of Ga.

[73] Assignee: Reliance Electric Industrial Company, Cleveland, Ohio

[21] Appl. No.: 904,661

[22] Filed: Aug. 1, 1997

[51] Int. Cl.⁶ .................................................. H02K 7/02
[52] U.S. Cl. .......................... 310/71; 174/65 R; 310/71; 29/596; 29/611
[58] Field of Search ........................... 310/71; 174/65 R; 29/611, 596

[56] References Cited

U.S. PATENT DOCUMENTS

| | | | |
|---|---|---|---|
| 4,771,534 | 9/1988 | Gellert et al. | 29/611 |
| 5,059,857 | 10/1991 | Brandt et al. | 310/366 |
| 5,095,612 | 3/1992 | McAvena | 29/596 |

*Primary Examiner*—Nestor Ramirez
*Assistant Examiner*—Thanh Lam
*Attorney, Agent, or Firm*—Craig N. Killen; John M. Miller; John J. Horn

[57] ABSTRACT

An electromechanical machine having an improved arrangement for sealing lead wires. A housing structure of the electromechanical machine includes a tubular lead conduit, such as a short pipe section, through which the lead wires extend. A resinous sealing compound, such as an epoxy, is located within the tubular lead conduit. The lead wires are thus potted, and a predetermined degree of isolation is provided between the inside of the machine housing and the ambient environment. Preferably, the inner surface of the tubular lead conduit defines a labyrinthine structure, such as a series of parallel grooves, to further enhance the sealing function.

10 Claims, 5 Drawing Sheets

ELECTROMECHANICAL MACHINE HAVING IMPROVED LEAD WIRE SEALING ARRANGEMENT

BACKGROUND OF THE INVENTION

The present invention relates generally to the art of electromechanical machines, such as generators or electric motors. More particularly, the invention relates to an improved sealing arrangement for electromechanical machines of the type that utilize potted lead wires.

Particularly in industrial applications, the lead wires of an electromechanical machine often terminate in an external conduit box. The conduit box is mounted to the machine's housing, and includes a threaded hole to which a wire conduit can be attached. Wires extending through the conduit are connected to the lead wires inside of the conduit box.

It is often necessary to ensure that the inside of the machine is isolated from the ambient environment. For example, certain electric motors are required to exhibit a predetermined degree of structural integrity in the event of internal explosion. Other motors may be required to operate while submersed in a liquid, or in ambient environments that are very cold. In such cases, appropriate sealing must be provided at the location where the lead wires emanate from inside of the machine housing.

The hole defined in the machine housing through which the lead wires extend will frequently have a diameter much larger than that of the lead wires themselves. Where sealing is required, the hole is often filled with a predetermined sealing compound which also functions to "pot" the lead wires extending therethrough.

In the past, a water-based sealing compound known as Savogran has seen widespread usage. While this product is effective for its intended purpose, it is not without disadvantages. For example, the Savogran product requires a time of several hours, e.g., often at least eight hours, in which to fully harden. Such a relatively lengthy period of idle time can lead to inefficiency and increased cost, particularly in a mass-production situation.

SUMMARY OF THE INVENTION

The present invention recognizes and addresses the foregoing disadvantages, and others of prior art constructions and methods. Accordingly, it is an object of the present invention to provide improvements to the art of electromechanical machines.

It is a further object of the present invention to provide an improved lead wire sealing arrangement for an electromechanical machine.

It is a more particular object of the present invention to provide an improved sealing arrangement for an electromechanical machine which is efficient in manufacture.

It is also an object of the present invention to provide a method of sealing lead wires emanating through a hole defined in a machine housing structure.

Some of these objects are achieved by an electromechanical machine comprising a housing structure defining a tubular lead conduit. A shaft is rotatably supported by the housing structure along a predetermined central axis. A stator is also provided, located inside of the housing structure and fixed with respect thereto. The stator has a plurality of conductive windings radially spaced about the central axis. A rotor, located inside of the housing structure radially inward of the stator, is fixed with respect to the shaft.

The electromechanical machine further comprises a plurality of lead wires electrically connected to the conductive windings. The lead wires extend through the tubular lead conduit to a location external of the housing structure. The lead wires are potted in a resinous compound located in the tubular lead conduit to provide a predetermined seal. Often, the tubular lead conduit will be defined by a separate tubular element attached to a main housing portion of the housing structure.

In some exemplary embodiments, the tubular lead conduit defines substantially parallel grooves on an inner surface thereof. The grooves in such embodiments are spaced apart in an axial direction. For example, the grooves may comprise a single spiral groove extending axially along the inner surface of the tubular lead conduit. The single spiral groove may often have a pitch of approximately eight grooves per inch. Toward this end, the inner surface of the tubular lead conduit may be threaded.

The resinous compound located in the tubular lead conduit preferably comprises an epoxy compound. For example, a two-part epoxy having a cure time of less than approximately fifteen (15) minutes may be utilized for this purpose. In addition, the epoxy compound is preferably a low-shrinkage epoxy having a shrinkage of approximately 0.001 inch per inch of length.

Other objects of the invention are achieved by a wire sealing arrangement comprising a main housing portion defining a first receiving hole therein. A tubular element is also provided, having a first end and a second end. The tubular element further defines a labyrinthine structure on an inner surface thereof.

The first end of said tubular element extends into the first receiving hole such that the tubular element is attached to the main housing portion. In addition, a plurality of electrical wires extend through said tubular element. A sealing compound is located in the tubular element to pot the electrical wires and provide a predetermined seal therethrough.

In presently preferred embodiments, the sealing compound is a resinous compound such as an epoxy compound. For example, a two-part epoxy having a cure time of less than approximately fifteen (15) minutes may be utilized for this purpose. In addition, the epoxy compound may comprise a low-shrinkage epoxy having a shrinkage of less than approximately 0.001 inch per inch of length.

Preferably, the labyrinthine structure comprises substantially parallel grooves. For example, the substantially parallel grooves may comprise a single spiral groove extending axially along the inner surface of the tubular element. Toward this end, the tubular element may be threaded on an inner surface thereof.

The tubular element will frequently define first exterior threads threadingly received into the first receiving hole. A conduit box may also be provided, defining a second receiving hole. In such cases, the second end of the tubular element is threadingly received in the second receiving hole.

Still further objects of the present invention are achieved by a method of sealing lead wires emanating through a hole defined in a machine housing structure. One step of the method involves providing a tubular element. The tubular element includes substantially parallel grooves defined on an inner surface thereof and spaced apart in an axial direction. As an additional step, the tubular element is attached to the machine housing structure in a predetermined relationship with respect to the hole. Next, the lead wires are drawn completely through the tubular element. With the lead wires thus drawn, a viscous resinous compound is introduced into the tubular element. Finally, the viscous resinous compound is caused to set in place about the lead wires and form a seal.

Accordingly to presently preferred methodology, the viscous resinous compound may be of a type that cures at room temperature. Preferably, the viscous resinous compound may be a two-part epoxy compound.

Other objects, features and aspects of the present invention are discussed in greater detail below.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying drawings, in which.

Figure 1:
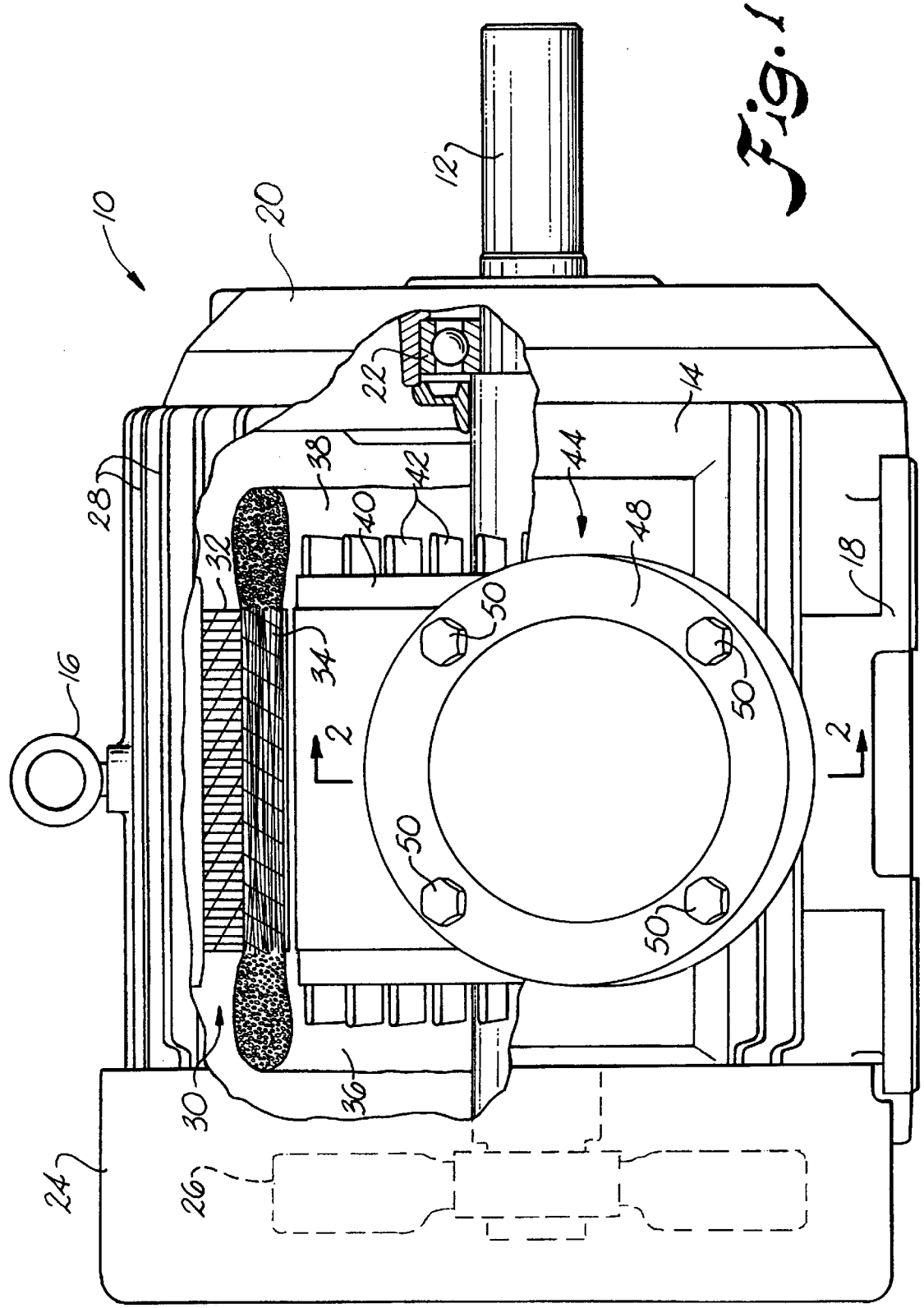
FIG. 1 is an elevational view of an electric motor showing the motor housing partially cut away to reveal various internal components therein.

Repeat use of reference characters in the present specification and drawings is intended to represent same or analogous features or elements of the invention.

DETAILED DESCRIPTION OF PREFERRED EMBODIMENTS

It is to be understood by one of ordinary skill in the art that the present discussion is a description of exemplary embodiments only, and is not intended as limiting the broader aspects of the present invention, which broader aspects are embodied in the exemplary constructions.

FIG. 1 illustrates an electromechanical machine constructed according to the present invention. In particular, FIG. 1 illustrates an electric motor 10 having a rotatable shaft 12 extending along a central axis. The internal components of motor 10 are enclosed by a housing including a main housing portion 14. One or more eyebolts 16 may be provided to facilitate lifting of motor 10. Main housing portion 14 defines an appropriate base 18 on which motor 10 will rest during use.

The housing of motor 10 further includes a pair of "end bells," such as end bell 20, located at respective axial sides of main housing portion 14. The end bells may be attached to main housing portion 14 by any appropriate means, such as by bolts. Typically, each end bell will maintain a respective bearing assembly, such as bearing assembly 22, for facilitating rotation of shaft 12. As shown, the opposite end bell is covered by a shroud 24.

Shaft 12 continues through bearing assembly 22 and beyond end bell 20 for connection to other equipment. The opposite end of shaft 12 carries a fan 26, located within shroud 24. Due to the configuration of shroud 24, rotation of fan 26 causes cooling air to circulate around various cooling fins 28 defined on the exterior of main housing portion 14.

Inside of its housing, motor 10 includes a stator 30 that remains fixed during operation. Stator 30 includes a slotted core 32 preferably comprising a plurality of relatively thin laminations arranged in a stack. As indicated at 34, longitudinal windings are located in the respective slots to provide a flow path for flux-generating current. The windings turn at respective coilheads 36 and 38 to return along a parallel slot.

A rotor 40, secured to shaft 12, desirably rotates based on the electromagnetic interaction between it and stator 30. In the illustrated embodiment, motor 10 is an induction motor, wherein rotor 40 is constructed as a "squirrel cage" in a known manner. A plurality of radial vanes, such as vanes 42, may be provided at the periphery of the rotor ends to circulate cooling air inside the motor housing.

Figure 2:
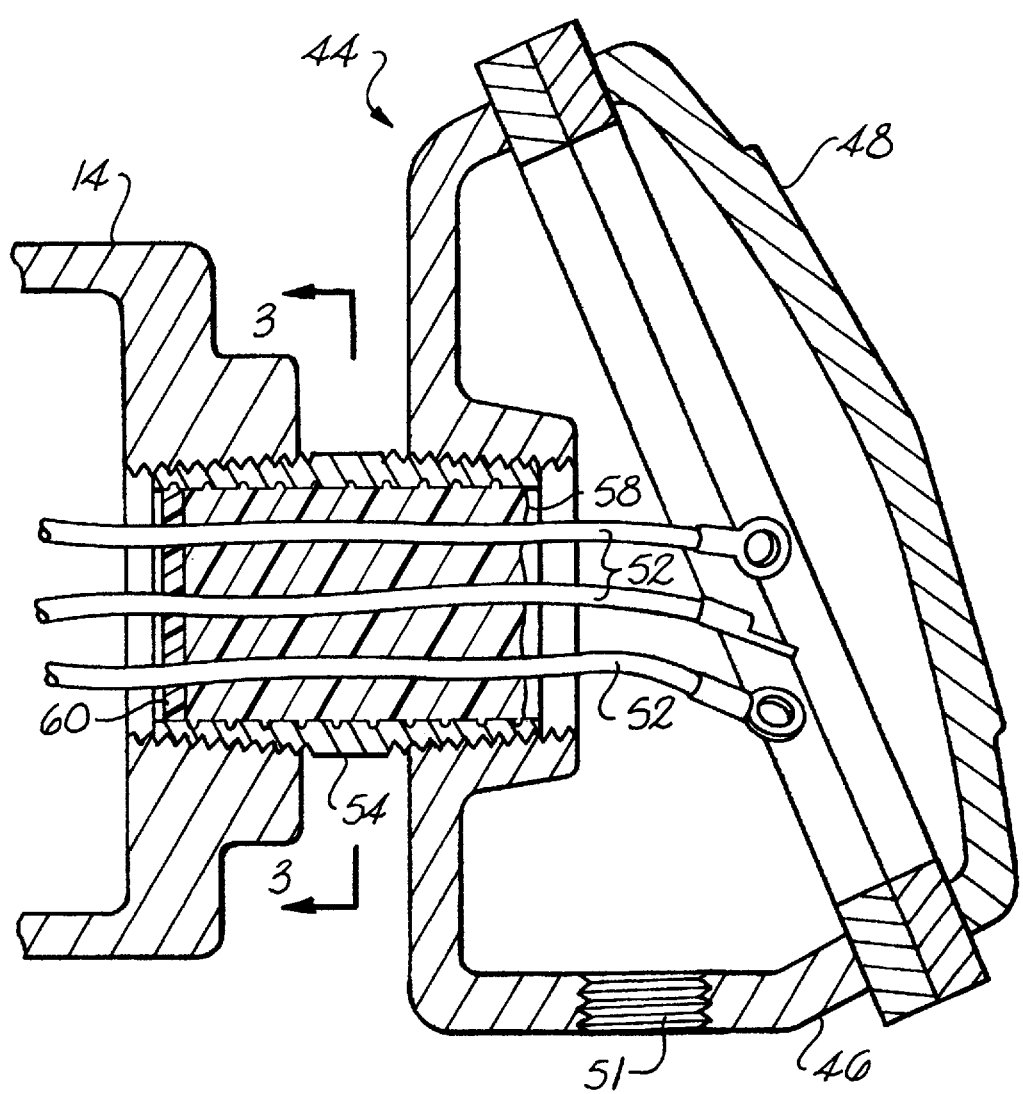
FIG. 2 is a cross sectional view taken along line 2—2 of FIG. 1 illustrating an improved lead wire sealing arrangement constructed in accordance with the present invention.

A conduit box 44 is mounted at the side of main housing portion 14 for facilitating various electrical connections. Referring now also to FIG. 2, conduit box 44 includes a base portion 46 having a cap portion 48 removably attached thereto. Base portion 46 typically defines a threaded conduit hole 51 into which the end of a wire conduit can be received. Wires extending through the wire conduit are electrically connected to various lead wires 52 of motor 10 at a location inside of conduit box 44. Typically, cap portion 48 is attached to base portion 46 utilizing a plurality of attachment bolts 50.

At least some of lead wires 52 are electrically connected to the conductive windings of stator 30. In the case of a three-phase motor, for example, three such power leads will generally be provided. Other lead wires may also be provided for electrical communication with thermocouples or other sensors located within the motor housing.

Figure 3:
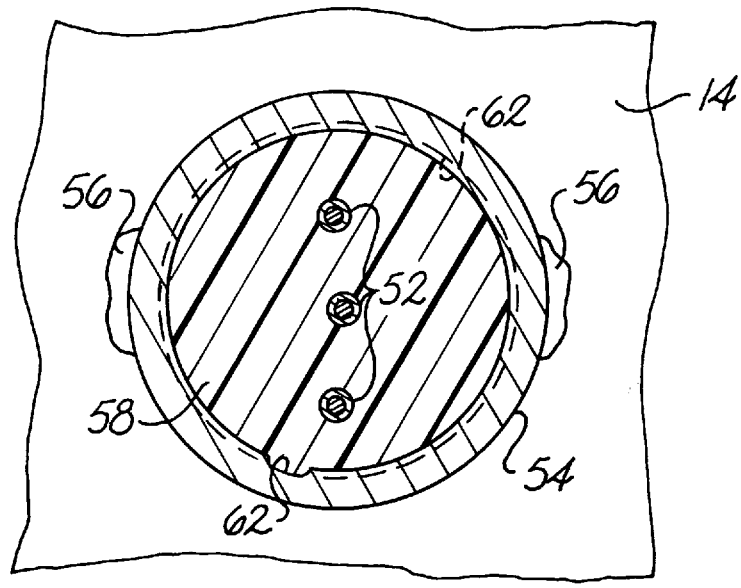
FIG. 3 is a cross sectional view as taken along line 3—3 of FIG. 2.

Conduit box 44 is mounted in position relative to main housing portion 14 utilizing a tubular element, such as pipe section 54, through which lead wires 52 extend. In this case, respective ends of pipe section 54 define exterior threads that engage the interior threads of receiving holes defined in main housing portion 14 and base portion 46, respectively. As can be seen most clearly in FIG. 3, spot welds 56 may be applied at the junction of pipe section 54 and main housing portion 14 to resist loosening as motor 10 is operated.

In this case, the region inside of pipe section 54 is sealed to provide isolation between the inside of main housing portion 14 and the ambient environment (including the inside of conduit box 44). Toward this end, lead wires 52 are securely potted in a sealing compound 58 located inside of pipe section 54. A grommet 60 defining through-holes for the respective lead wires 52 is located axially inward of sealing compound 58, as shown. Generally, grommet 60 will be constructed of rubber or a like elastomeric material.

Preferably, sealing compound 58 is a low shrinkage epoxy compound, e.g., having a shrinkage of less than approximately 0.001 inch per inch of length between its viscous and cured states. Low shrinkage is desirable to prevent the formation of gaps between the sealing compound and the inner surface of pipe section 54 as the epoxy cures. An epoxy having a cure time of less than approximately fifteen (15) minutes is also especially desirable to enhance manufacturing efficiencies.

In addition to the above, the epoxy utilized in the present invention is also preferably non-active with respect to lead wires 52, and is capable of withstanding wide temperature variations after curing. An epoxy compound designated FEL-PRO 282/024TC, Product No. 96193, available from Restech of Commerce City, Colo. has been found suitable. This product is a two-part epoxy, including separate resin and hardener components. The two-parts are combined as they are introduced into pipe section 54, which immediately begins the curing process at room temperature. Grommet 60 functions to hold lead wires 52 in their relative positions while the epoxy cures.

A predetermined labyrinthine structure is preferably defined on the inner surface of pipe section 54. In presently preferred embodiments, this labyrinthine structure may be produced by defining a series of parallel grooves spaced apart along the inner surface of pipe section 54 in the axial direction. Because the epoxy extends into these grooves, a labyrinthine path is provided to enhance the sealing function. The labyrinthine structure is also believed to limit shrinkage of the epoxy during curing.

Figure 4:
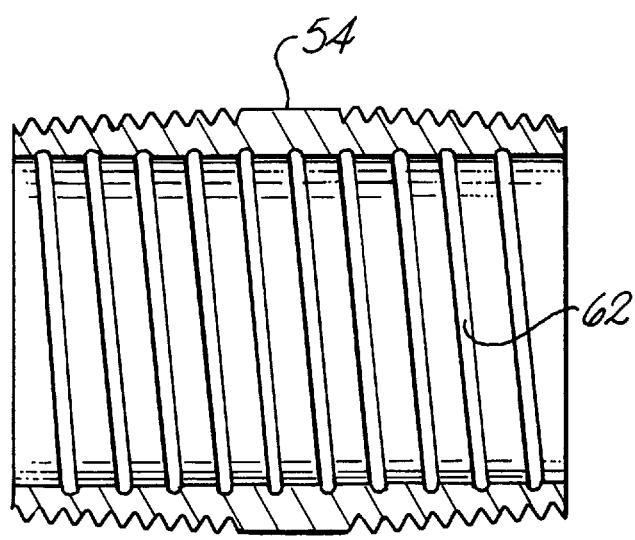
FIG. 4 is a cross sectional view of the tubular element of FIG. 2 with the resin compound removed to more clearly illustrate the groove structure.

FIG. 4 illustrates one configuration of the preferred labyrinthine structure, where the parallel grooves are actually adjacent turns of a single spiral groove 62. Spiral groove 62 may be formed as threads on the inner surface of pipe section 54. A pitch of approximately eight threads per inch may be utilized to provide a sufficient length to spiral groove 62.

Figure 2A:
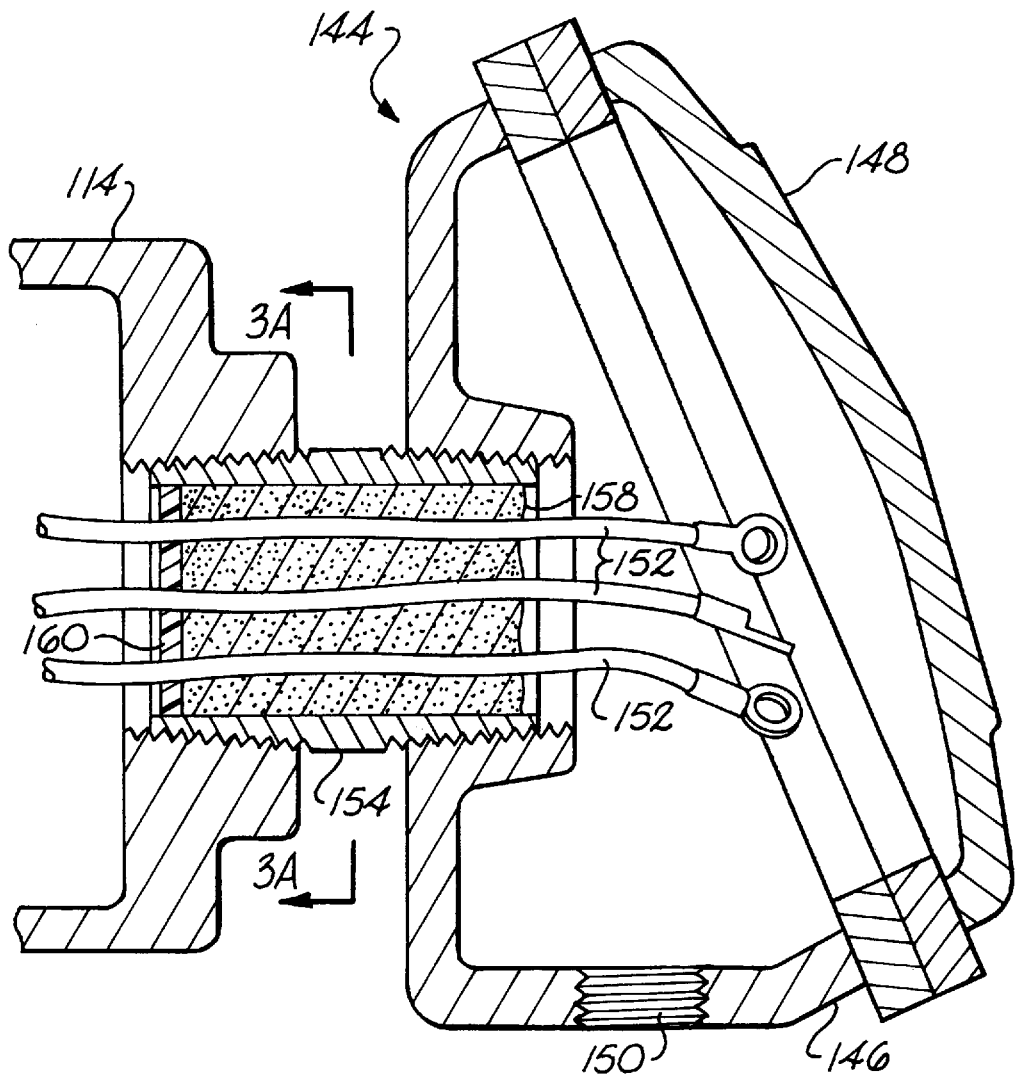
FIG. 2A is a view similar to FIG. 2 of a lead wire sealing arrangement of the prior art.
Figure 3A:
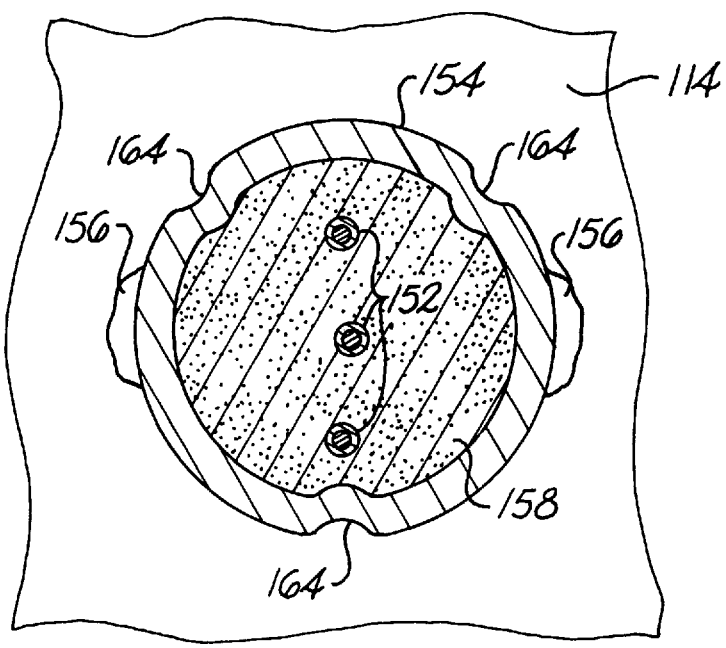
FIG. 3A is a cross sectional view as taken along line 3A—3A of FIG. 2A.

The prior art arrangement utilizing Savogran sealing compound is illustrated in FIGS. 2A and 3A. For the sake of brevity, elements analogous to those shown in other Figures will not be discussed in detail, but are designated by reference numbers augmented by one-hundred. One skilled in the art will appreciate the structure and operation of the prior art without a detailed explanation.

The Savogran product is supplied in the form of a powder, which must be mixed with water prior to use. The mixture thus formed is poured into pipe section 154 and allowed to dry. In contrast to fast-curing epoxy preferably utilized in the present invention, the Savogran product of the prior art often required at least eight hours to fully harden. As shown in FIG. 3A, the hardened sealing compound is held in position by a series of angularly spaced indentations 164. Unlike embodiments of the present invention, the inside surface of pipe section 154 is otherwise smooth.

It can thus be seen that the present invention provides an improved arrangement for sealing lead wires of an electromechanical machine. While preferred embodiments of the invention have been shown and described, modifications and variations may be made thereto by those of ordinary skill in the art without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only, and is not intended to be limitative of the invention so further described in such appended claims.

What is claimed is:

1. An electromechanical machine comprising:
    a housing structure defining a tubular lead conduit having an inner conduit surface;
    said conduit surface defining at least one groove along a portion of the conduit surface;
    said groove comprising a radial component;
    a shaft rotatably supported by said housing structure along a predetermined central axis;
    a stator located inside of said housing structure and fixed with respect thereto, said stator having a plurality of conductive windings radially spaced about said central axis;
    a rotor located inside of said housing structure radially inward of said stator, said rotor being fixed with respect to said shaft;
    a plurality of lead wires electrically connected to said conductive windings, said lead wires extending through said tubular lead conduit to a location external of said housing structure; and
    said lead wires being potted in a resinous compound located throughout a portion of said tubular lead conduit to provide a seal.

2. An electromechanical machine as set forth in claim 1, wherein said groove further comprises an axial component.

3. An electromechanical machine as set forth in claim 2, wherein said groove comprises a single spiral groove extending axially along said inner surface of said tubular lead conduit.

4. An electromechanical machine as set forth in claim 3, wherein said single spiral groove has a pitch of approximately eight grooves per inch.

5. An electromechanical machine as set forth in claim 3, wherein said tubular lead conduit is defined by a separate tubular element attached to a main housing portion of said housing structure.

6. An electromechanical machine as set forth in claim 1, wherein said resinous compound comprises an epoxy compound.

7. An electromechanical machine as set forth in claim 6, wherein said epoxy compound comprises a two-part epoxy having a cure time of less than twenty (20) minutes.

8. An electromechanical machine as set forth in claim 6, wherein said epoxy compound comprises a low-shrinkage epoxy.

9. An electromechanical machine as set forth in claim 6, wherein said tubular lead conduit is defined by a separate tubular element attached to a main housing portion of said housing structure.

10. An electromechanical machine as set forth in claim 9, wherein said tubular element defines exterior threads threadingly received into said main housing portion of said housing structure.

* * * * *